United States Patent [19]

Moreno

[11] Patent Number: 4,481,019

[45] Date of Patent: Nov. 6, 1984

[54] METHOD AND APPARATUS FOR EXTRACTING SOLIDS FROM A GAS STREAM FLOWING IN A PNEUMATIC TRANSPORT LINE

[76] Inventor: Frederick E. Moreno, 1386 Holt Ave., Los Altos, Calif. 94022

[21] Appl. No.: 267,378

[22] Filed: May 26, 1981

[51] Int. Cl.³ .................... B01D 45/08; B01D 45/16; B65G 53/60
[52] U.S. Cl. ........................... 55/96; 55/1; 55/290; 55/289; 55/317; 55/319; 55/430; 55/460; 55/461; 209/143; 406/106; 406/169; 406/173
[58] Field of Search .............. 55/1, 96, 290, 317, 55/289, 319, 400, 430, 459 D, 460, 461, 466, 296; 19/200, 205; 406/106, 168, 173, 169; 209/143

[56] References Cited

U.S. PATENT DOCUMENTS

| 985,037 | 2/1911 | Johnston | 19/205 |
|---|---|---|---|
| 1,230,757 | 6/1917 | Morrison | 55/461 |
| 1,581,363 | 4/1926 | Streun | 55/290 |
| 2,642,152 | 6/1953 | Dohrer | 55/257 C |
| 3,710,561 | 1/1973 | Garrone | 55/461 |
| 3,870,627 | 3/1975 | Herkes | 209/236 |
| 3,917,567 | 11/1975 | Barrett | 209/142 |
| 4,294,597 | 10/1981 | Archer et al. | 55/290 |

Primary Examiner—David L. Lacey
Attorney, Agent, or Firm—Harry E. Aine

[57] ABSTRACT

In an extraction method and apparatus for extracting low biomass solid materials from a pneumatic transport line, the stream of gas having the solids entrained therein is caused to flow over a toothed extractor wheel. The toothed wheel picks out of the stream the solid materials which are then doffed from the tooth extractor wheel by the vanes of a rotating valve which seals the pressure of the pneumatic transport line from the ambient. The material doffed from the extractor wheel falls into the region between the vanes of the rotary valve and is then removed from the system as the vanes of the valve rotate. The air stream which is inducted into the extractor is first caused to pass through a diffuser which slows the velocity of the air stream and then the air stream is cause to flow along a curved duct section toward the extractor wheel causing the solid materials to flow to the outside of the curved duct section and into the extractor wheel to facilitate extraction.

9 Claims, 4 Drawing Figures

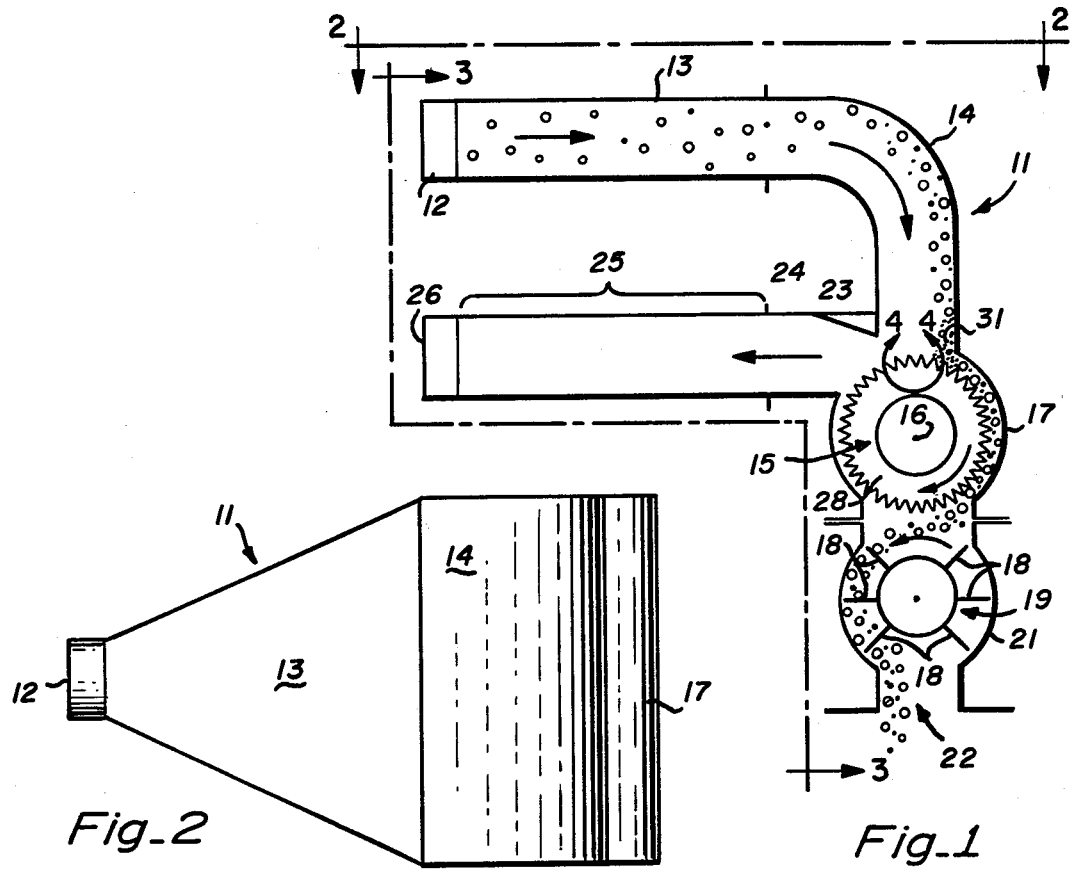
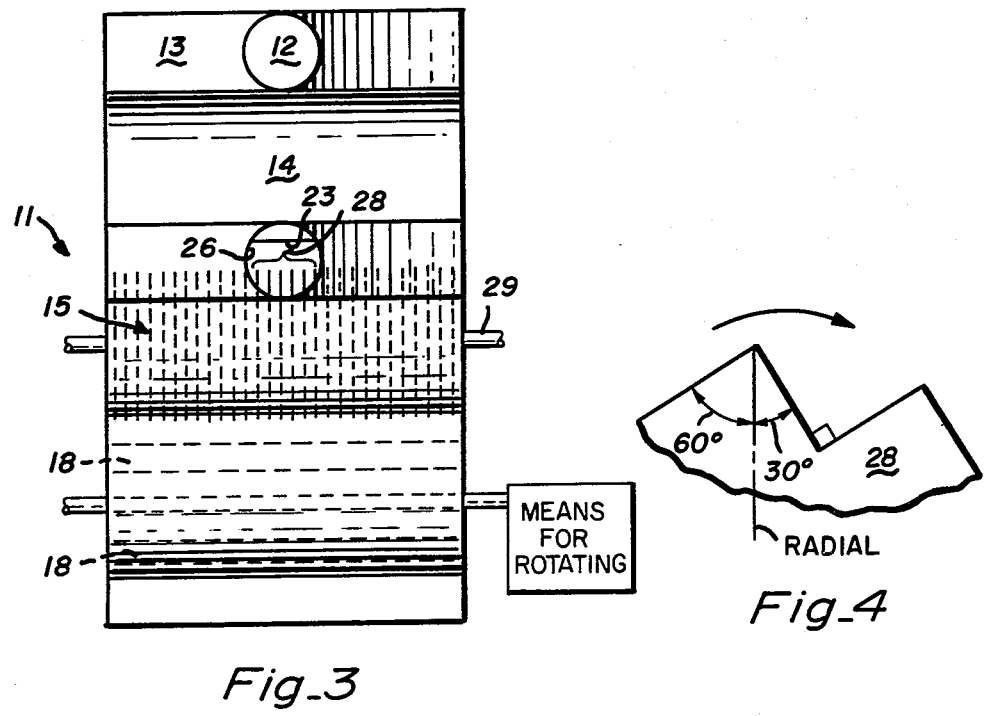

METHOD AND APPARATUS FOR EXTRACTING SOLIDS FROM A GAS STREAM FLOWING IN A PNEUMATIC TRANSPORT LINE

BACKGROUND OF THE INVENTION

The present invention relates in general to means for extracting solids from a pneumatic transport line and, more particularly, to devices particularly suited for removing low density biomass materials, such as cotton gin waste, from a pneumatic transport line.

DESCRIPTION OF THE PRIOR ART

Heretofore, machines had been devised for separating low density biomass material, such as cotton, from pneumatic transport lines. These machines have typically utilized a screen through which the air stream having the material entrained therein is caused to pass. The screen catches the material and the material is subsequently removed from the screen by means of a doffing wheel or the like. The doffed material is then caused to pass through a rotary valve for sealing the pressure of the pneumatic line from the ambient pressure. Examples of such machines are found in the U.S. Pat. No. 1,945,820 issued February 1934 and U.S. Pat. No. 1,849,649 issued Mar. 15, 1932.

Such machines are useful for removing substantially all of the cotton entrained in a pneumatic transport line but are not suited for intermittent operation in the sense that the pneumatic transport line is permitted to run continuously while the extractor works on an intermittent basis for periodically extracting material from the transport line.

It is also known from the prior art, in connection with removing cinders and ash from a pneumatic line, to cause the gas stream to flow along a curved path toward a rotary valve such that the materials entrained in the gas stream are caused to be collected upon a side wall and to slide into the rotating vanes of the rotary valve and thence out of the pneumatic transport line via the valve. An example of such a centrifugal cinder collector is disclosed in U.S. Pat. No. 2,642,152 issued June 16, 1953. While such a device is particularly suited for removing dust and cinder particulate matter from a pneumatic transport line it is not suited for intermittently removing low density fibrous materials, such as cotton and cotton gin trash, from a pneumatic transport line because when the rotary valve is not rotating i.e., material is not being removed from the transport line, the cotton gin waste tends to mat at the vanes and produce a blockage which cannot be removed by subsequent rotation of the rotary valve.

Thus, it is desired, for some applications such as for extracting cotton gin waste from a pneumatic transport line for use as feedstock in a gasifier or combustor which is subject to intermittent operation, to permit the fibrous material to mat around the inoperative extraction device and then when it becomes operable to pull the matted material through the extractor and pass it out of the pneumatic transport line through a rotary valve.

SUMMARY OF THE PRESENT INVENTION

The principal object of the present invention is the provision of an improved extraction method and apparatus for extracting solids from a pneumatic transport line and, more particularly, to one particularly suited for removing low density biomass feedstock materials, such as cotton gin waste, and bagasse, on an intermittant basis.

In one feature of the present invention, solids entrained in a stream of gas are passed over a revolving toothed extractor wheel to cause the solids to be picked out of the stream by the revolving toothed wheel. The solids caught on the toothed extractor wheel are then doffed therefrom and passed through a rotary valve for removing the materials from the transport line while sealing the pressure of the pneumatic transport line from the pressure on the other side of the valve.

In another feature of the present invention a gas stream having the solids entrained therein is caused to flow along a curved path toward the toothed extractor wheel to cause the entrained solids to be thrown toward the extractor wheel to facilitate extraction thereof.

In another feature of the present invention, the velocity of the gas stream in the region of the extractor wheel is reduced so as to facilitate extraction of the solids by the toothed extractor wheel.

In another feature of the present invention, the rotary valve includes a plurality of vanes which serve the dual purpose of sealing the pneumatic transport line from the ambient pressure while doffing the solids from the toothed extractor wheel and causing the doff material to pass through the rotary valve and out of the pneumatic transport line.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view, in line diagram form, of an extractor incorporating features of the present invention, FIG. 2 is a top view of the structure of FIG. 1 taken along line 2—2 in the direction of the arrows, FIG. 3 is an end view of the structure of FIG. 1 taken along line 3—3 in the direction of the arrows, and FIG. 4 is an enlarged view of a portion of the structure of FIG. 1 delineated by line 4—4.

DESCRIPTION OF THE PREFERRED EMBODIMENTS

Referring now to FIGS. 1-4 there is shown a toothed extractor system 11 for extracting low density solid biomass materials from a pneumatic transport line and incorporating features of the present invention. Extractor system 11 includes a cylindrical inlet duct 12 which is 8 inches in diameter, for connection to the pneumatic transport line for inducting into the extractor system 11 the gas stream having the entrained solid particles to be extracted therefrom. The gas stream inducted into the extractor system 11 first passes into a diffuser section 13 which increases the cross sectional area of the flow passageway by a factor of approximately four so that velocity of the gas stream is reduced by a factor of four. In a typical example the gas stream has a pressure within the range of of 2 to 12 p.s.i. gauge with a flow rate of between 1000 to 2000 actual cubic feet per minute with a velocity of between 50–100 feet per second.

The diffuser 13 reduces the velocity of the gas stream and thence it is fed into a 90° curved duct section 14 for throwing the solid particles toward the outside wall of the curved duct section 14. In a typical example, the curved duct section 14 has an inside radius of approximately 8 inches. The particles which are thrown to the outside wall of the curved duct section 14 move down along the outside wall to a toothed extractor wheel 15 which is 12 inches in diameter.

The toothed extractor wheel 15 rotates about an axis of revolution 16 transversely directed of the duct 14, and within a cylindrical housing 17. The axis of revolution 16 is eccentrically positioned within the housing 17 such that the clearance between the toothed extractor wheel 15 and the inside wall of the cylindrical housing is greater at the side thereof coextensive with the outside wall of the curved duct section 14. The toothed extractor wheel is caused to rotate in the opposite direction to the flow of gas through the extractor system 11 so as to facilitate extraction.

Solid material entrained in the gas stream is thus thrown to the outside of the curved duct section 14 and directed onto the toothed extractor wheel 15 which picks out the solid particles and moves then out of the gas stream. The particles caught on the teeth of the extractor wheel 15 are doffed therefrom via the rotating vanes 18 of a rotary valve 19 housed in a cylindrical housing 21 coupled to the cylindrical housing 17 of the toothed extractor wheel 15. In a preferred embodiment, vanes 18 have a tip velocity approximately twice the tip velocity of the teeth on the toothed extractor wheel 15. The vanes 18 pass in close proximity to the teeth of the toothed extractor wheel for doffing the solid material into the region of the rotary valve 19 between adjacent vanes 18. The doffed material is thus carried via the rotary valve 19 and dropped through an exit port 22 at ambient pressure. The rotary valve 19 seals the ambient pressure from the pressure within the pneumatic transport line in flow communication with the extraction system 11. A means for rotating 33 the rotary valve 19 is coupled to its shaft for rotation thereof.

A constriction 23 is provided along the inside edge of the induction bend portion 14 to further force the gas stream toward the teeth of the toothed extractor wheel 15. The gas stream which exits from the region of the toothed extractor wheel 15 passes through a section of rectangular duct 24 and thence through a diffuser section 25 which increases the velocity of the air stream at a cylindrical output port 26 back to a value which is essentially the same as the velocity of the input stream at port 12.

In a typical example, the toothed extractor wheel 15 comprises a multitude of discs 28 which are $\frac{1}{8}$ inch thick and 12 inches in diameter. Each disc is serrated at the outer periphery to form the teeth having a configuration as shown in FIG. 4 wherein the peak elevation of each tooth is approximately 1 inch from its base and the leading edge of each tooth has an angle of approximately 30° relative to the radial, whereas the trailing edge of each tooth make an angle of approximatley 60° with the radial. The leading edge of one tooth and the trailing edge of the preceeding tooth have an included angle of approximately 90°.

The discs 28 are axially spaced apart by 1 inch upon a common shaft 29. The toothed extractor wheel 15 is typically operated at 10 to 30 RPM and the rotary valve 19 operates at twice the RPM of the toothed wheel 15. A suitable rotary valve 19 is one commercially available from Radar Pneumatics of Portland, Oreg. The extractor system 11 operates at a p.s.i. gauge of approximately 2 pounds per square inch for cotton gin trash and is capable of extracting between 4000 and 6000 pounds per hour from the pneumatic transport line. The extractor 11 removes approximately 90% of the cotton gin trash when in operation. When the extractor wheel is stopped and the pneumatic transport line continues to flow, the cotton gin trash or other solid material tends to build up a mat of material in front of the extractor wheel 15 at 31. This matted material is quickly dissipated and pulled through the toothed extractor wheel 15 and rotary valve 19 when the toothed extractor wheel 15 is put into rotation.

The advantage to the extractor system 11 of the present invention is that it allows intermittent operation of the extractor system, as desired, while removing a relatively high percentage of the solid material when in operation. It is particularly suited for low density biomass materials such as cotton gin trash. Other suitable low biomass materials include, rice hulls, rice straw, manure, chicken bedding, wheat straw, cotton stalks, and shredded wood.

What is claimed is:

1. A method for separating solids out of a gas stream flowing in a pneumatic transport line, including the steps of:

passing the solids entrained in a stream of gas in the pneumatic transport line over a revolving toothed extractor wheel to cause solids to be picked out of the stream by the revolving toothed wheel;

doffing the solids from the toothed extractor wheel; and passing the doffed solids through a rotary valve for removing the solids from the transport line while sealing the pressure of the pneumatic transport line from the pressure on the other side of said valve.

2. The method of claim 1 wherein the steps of passing the stream of gas over a revolving toothed extractor wheel includes the steps of causing the gas stream to flow along a curved path toward the toothed extractor wheel to cause the entrained solids to flow along the outer periphery of the curved path and to flow toward the toothed extractor wheel to facilitate extraction thereof.

3. The method of claim 2 including the step of reducing the velocity of the gas stream in the region of the curved flow path to facilitate extraction of the solids by the toothed wheel.

4. The method of claim 1 wherein the rotary valve includes a set of rotating vanes and wherein the step of doffing the solids from the toothed extractor wheel includes the step of causing the rotating vanes of the rotary valve to rotate with a tip velocity higher than that of the tip velocity of the teeth of the tooth extractor wheel and causing the rotating vanes of the rotary valve to doff the solids from the toothed extractor wheel.

5. An apparatus for separating solids out of a gas stream flowing in a pneumatic transport line, including:

gaseous duct means having a gas inlet and a gas outlet for containing a stream of gas having solids entrained therein and forming the pneumatic transport line for transporting solids;

solids duct means having a solids inlet and a solid outlet for containing a flow of solids and connected in gas communication with the pneumatic transport line;

toothed extractor means in gas flow communication with said solids duct means and said gaseous duct means between said gas inlet and gas outlet of said gaseous duct means and for revolution about an axis of revolution thereof for picking solids out of the stream of gas passing by the revolving toothed extractor means;

rotary valve means connected in gas communication with said solids duct means between said solids inlet and solids outlet and having a plurality of vanes for sealing the pressure of the pneumatic transport line from the pressure on the solids outlet side of said valve means and being constructed and arranged to doff the solids from said toothed extractor means and for passing the doffed solids through said solids duct means to said solids outlet whereby the solids are removed from the pneumatic transport line while maintaining the pressure of the pneumatic transport line relative to ambient.

6. The apparatus of claim 5 wherein said gaseous duct means for passing the solids entrained in the stream of gas over said toothed extractor means includes a curved section for causing the gas stream to flow along a curved path toward the toothed extractor means to cause the entrained solids to flow along the outer periphery of the curved path and to flow toward said toothed extractor means to facilitate extraction of the solids.

7. The apparatus of claim 6 including means for reducing the velocity of the gas stream in the region of the curved flow path to facilitate extraction of the solids by said toothed extractor means.

8. The apparatus of claim 5 wherein said rotary valve means is disposed relative to said toothed extractor means such that said rotating vanes of said rotary valve doff the solids from said toothed extractor means.

9. The apparatus of claim 8 including means for causing said rotating vanes of said rotary valve to rotate at a tip velocity higher than the tip velocity of the teeth of said toothed extractor means to facilitate doffing of the solids from said toothed extractor means by said rotating vanes of said rotary valve means.

* * * * *